United States Patent
Wang et al.

[11] Patent Number: 5,838,092
[45] Date of Patent: Nov. 17, 1998

[54] APPARATUS AND METHOD FOR VIBRATION CONTROL USING ACTIVE CONSTRAINED LAYER EDGE ELEMENTS

[75] Inventors: Kon-Well Wang; Wei-Hsin Liao, both of Centre County, Pa.

[73] Assignee: The Penn State Research Foundation, University Park, Pa.

[21] Appl. No.: 705,111

[22] Filed: Aug. 29, 1996

Related U.S. Application Data

[60] Provisional application No. 60/003,138 Sep. 1, 1995.
[51] Int. Cl.[6] ................................................ H01L 41/08
[52] U.S. Cl. ........................................ 310/326; 310/345
[58] Field of Search ................................... 310/325, 326, 310/345, 348

[56] References Cited

U.S. PATENT DOCUMENTS

| | | | |
|---|---|---|---|
| 3,728,562 | 4/1973 | Herson et al. | 310/345 X |
| 4,148,183 | 4/1979 | Murakami | 310/345 X |
| 4,626,730 | 12/1986 | Hubbard, Jr. | 310/326 |
| 5,315,203 | 5/1994 | Bicos | 310/345 X |
| 5,485,053 | 1/1996 | Baz | 310/326 |
| 5,519,278 | 5/1996 | Kahn et al. | 310/326 |

FOREIGN PATENT DOCUMENTS 0013581  1/1980  Japan ..................................... 310/345

OTHER PUBLICATIONS

Baz, A. and Ro, J., "The Concept and Performance of Active Constrained Layer Damping Treatments", *Sound and Vibration*, Mar. 1994, pp. 18–21.

Baz, A., "Partial Treatment of Fexible Beams with Active Constrained Layer Damping", Recent Developments in Stability, Vibration, and Control of Structural Systems, *Proc. of ASME*, AMD–167, pp. 61–80 (1993).

*Primary Examiner*—Mark O. Budd
*Attorney, Agent, or Firm*—Flehr Hohbach Test Albritton & Herbert LLP; William S. Galliani

[57] ABSTRACT

An active constrained layer system includes a passive viscoelastic damping material positioned on top of a substrate. An active piezoelectric layer is positioned on top of the passive viscoelastic damping material. An edge element physically connects the active piezoelectric layer to the substrate to transmit active forces and moments from the piezoelectric layer to the substrate. The novel edge element yields higher active control from the piezoelectric layer, while preserving the damping capacity of the passive viscoelastic layer. The edge element may be implemented in a variety of ways, including an edge element clamp structure and an edge element post structure.

12 Claims, 2 Drawing Sheets

APPARATUS AND METHOD FOR VIBRATION CONTROL USING ACTIVE CONSTRAINED LAYER EDGE ELEMENTS

This application claims priority to the U.S. Provisional application Ser. No. 60/003,138, filed Sep. 1, 1995, entitled "A New Intelligent Constrained Layer Actuator with Edge Elements for Active Action Enhancement".

BRIEF DESCRIPTION OF THE INVENTION

This invention relates generally to techniques for reducing structural vibration. More particularly, this invention relates to an active-passive hybrid vibration control system utilizing active constrained layer edge elements.

BACKGROUND OF THE INVENTION

Structural vibration control technology is important in a variety of technical fields. For example, structural vibration control technology is critical in rotating mechanical devices. For instance, it is important to reduce vibration on turbine blades and turbine rotors.

Structural vibration control technology has traditionally been categorized into two main areas, namely, passive control systems and active control systems. In a passive control system, dissipative and reactive mechanisms, such as dampers and absorbers, are utilized. The control parameters are synthesized through off-line design techniques and on-line feedback action is not used. The advantages of this approach are that the devices are usually relatively simple and the system will always be stable. However, since the technique relies upon fixed designs, the control will not be optimal when the system or the operating conditions change.

In an active control system, sensors are used to identify vibration. After a sensor identifies vibration, control signals are applied to actuators in order to suppress the vibration. An active control system adapts to system changes and therefore is much more effective than a passive control system. Unfortunately, active control systems have relatively high power requirements. In addition, they can be de-stabilized due to uncertainties from model parameter errors, actuator/sensor dynamics, and measurement noise. Active control systems can also be complicated by interactions between the controller and the uncontrolled modes (residual modes), the so-called spillover problem.

To overcome the individual shortcomings of passive control systems and active control systems, active-passive hybrid control systems are used. Such systems use active actuators and passive devices. This approach normally requires less power than active control systems. Also, since energy is always being dissipated, it is insensitive to spillover and is much more stable than the active approach. In other words, it has the advantages of both a passive control system (stable, fail-safe, lower power consumption) and an active control system (high performance, feedback and feedforward action).

Continuing developments in materials science have provided a number of promising materials, so-called "smart" materials, with adaptable properties that can be used as sensor or actuator elements. In particular, researchers have found that piezoelectric materials can be designed to be very effective active vibration control actuators. Also, because of high piezoelectric coupling, these materials have been studied for their ability to damp vibration passively. Due to their active and passive features, piezoelectric materials are being used for active-passive hybrid control. Two known piezo-based active-passive hybrid control structures are (1) systems with active-passive piezoelectrical networks, and (2) systems with active constrained damping layers (also known as "Intelligent Constrained Layers"). The present invention is directed toward active constrained damping layers.

FIG. 1 illustrates an active constrained layer (ACL) system 20 in accordance with the prior art. The ACL system 20 includes a passive viscoelastic damping material (VEM) 22 positioned on a substrate 24. An active piezoelectric layer 26 is positioned on top of the passive viscoelastic damping material 22. A sensor 28 is used to identify vibrations within the substrate 24. The sensor 28 may be positioned in a variety of locations, for instance, between the viscoelastic damping material 22 and the substrate 24. In response to vibrations identified by the sensor 28, a controller 30 generates a control signal that is applied to a voltage source 32. The voltage source 32 applies a control voltage to the active piezoelectric damping layer 26 to suppress the vibrations of the substrate 24.

It has been observed that the active piezoelectric layer 26 increases the viscoelastic damping material 22 shear angle and therefore increases damping ability. On the other hand, the presence of the viscoelastic damping material 22 reduces the transmission of forces between the active piezoelectric layer 26 and the substrate 24. Thus, in some cases, a purely active system (no viscoelastic damping material 22) has better vibration reduction.

In view of the foregoing, it would be highly desirable to reduce the detrimental effect that the viscoelastic damping material 22 has on transmitting forces from the active piezoelectric layer 26 to the substrate 24. In addition, it would be highly desirable to maintain the passive damping benefits of a viscoelastic damping material 22 to improve vibration suppression capability in existing active constrained layer systems 20.

SUMMARY OF THE INVENTION

An embodiment of the invention is an active constrained layer system with a passive viscoelastic damping material positioned on top of a substrate. An active piezoelectric layer is positioned on top of the passive viscoelastic damping material. An edge element physically connects the active piezoelectric layer to the substrate to transmit active forces and moments from the piezoelectric layer to the substrate. The edge element may be implemented in a variety of ways, including an edge element clamp structure and an edge element post structure.

The disclosed structures yield higher active control from the piezoelectric layer, while preserving the damping capacity of the passive viscoelastic layer. Thus, the apparatus of the invention achieves more damping than a purely active structure. Simultaneously, the apparatus of the invention preserves the benefits of current active constrained layer structures. Advantageously, the invention is compatible with known active constrained layer structures and can be implemented using known techniques.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
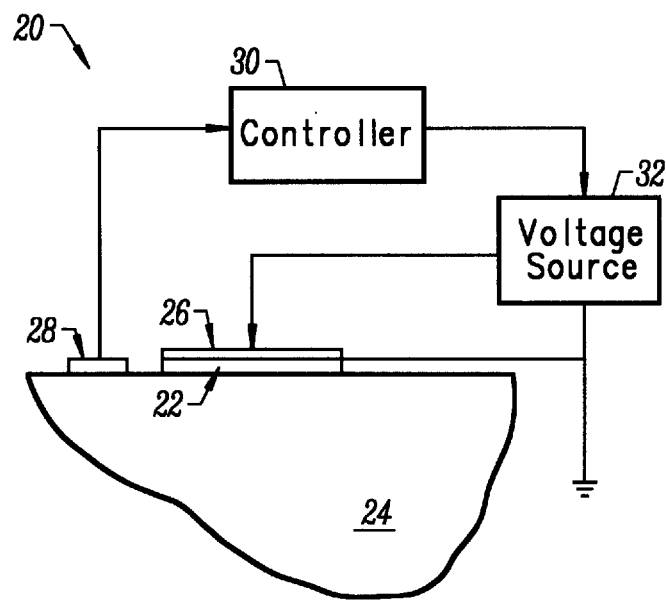
FIG. 1 illustrates an active constrained layer system in accordance with the prior art.
Figure 2:
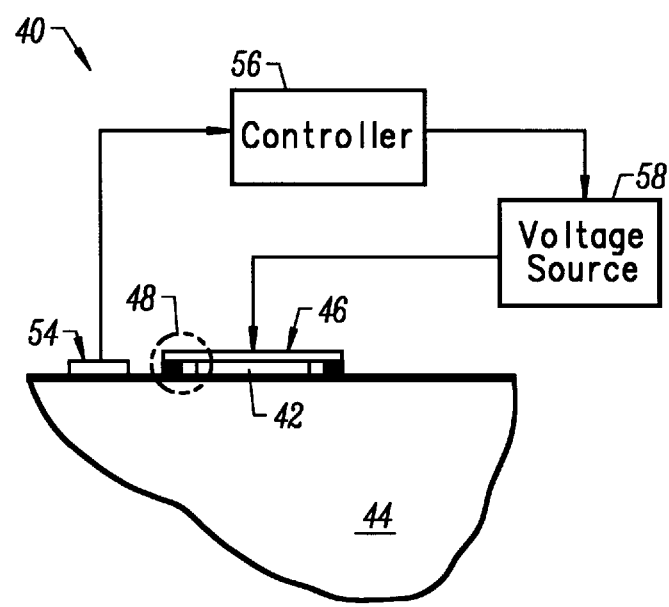
FIG. 2 illustrates an active constrained layer system in accordance with an embodiment of the invention.

FIG. 2 illustrates an active constrained layer (ACL) system 40 constructed in accordance with an embodiment of the invention. The system 40 includes a passive viscoelastic damping material (VEM) 42, of the type known in the art, positioned on top of a substrate 44. An active piezoelectric layer 46, of the type known in the art, is positioned on top of the VEM layer 42. In accordance with the invention, one or more edge elements, generally illustrated with a circle 48, is used to physically connected the piezoelectric layer 46 to the substrate 44. An edge element on the boundary of the piezoelectric layer 46 operates to increase the transmission of active control to the substrate 44. That is, the edge element directly transmits active forces and moments from the piezoelectric layer 46 to the substrate 44. As a result, there is higher active control from the piezoelectric layer 46, while the damping ability of the passive viscoelastic layer 42 is maintained. Consequently, the invention yields more damping than a purely active structure, while preserving the high control available through the use of an active constrained layer 42.

Figure 3:
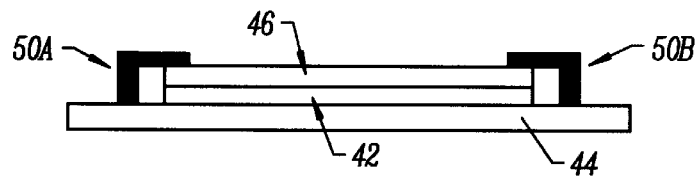
FIG. 3 illustrates an active constrained layer structure in accordance with a first embodiment of the invention.
Figure 4:
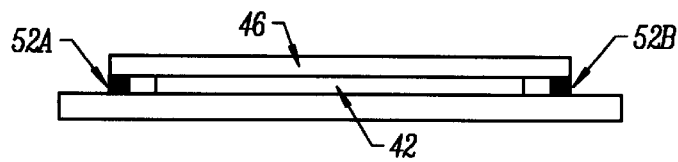
FIG. 4 illustrates an active constrained layer structure in accordance with a second embodiment of the invention.

FIG. 3 illustrates edge elements implemented as clamp structures. In particular, the figure illustrates a first clamp structure 50A and a second clamp structure 50B. FIG. 4 illustrates edge elements implemented as post structures. In particular, the figure illustrates a first post structure 52A and a second post structure 52B.

Returning now to FIG. 2, the invention can be implemented with a standard sensor 54, which generates a sensor signal in the presence of vibrations of the substrate 44. As known in the art, the sensor may be positioned in a variety of locations. The sensor is used to generate a sensor signal that is applied to a controller 56, which may also be a prior art device. The controller 56 generates a standard control signal for application to an energy source 58, shown by way of example as a voltage source , but a charge source or similar device may also be used. The energy source 58 generates an energy signal that is applied to the active piezoelectric layer 46. In accordance with the invention, the applied energy signal is more effective as the active piezoelectric layer 46 directly transmits forces to the substrate 44, via the edge elements of the invention.

Figure 5:
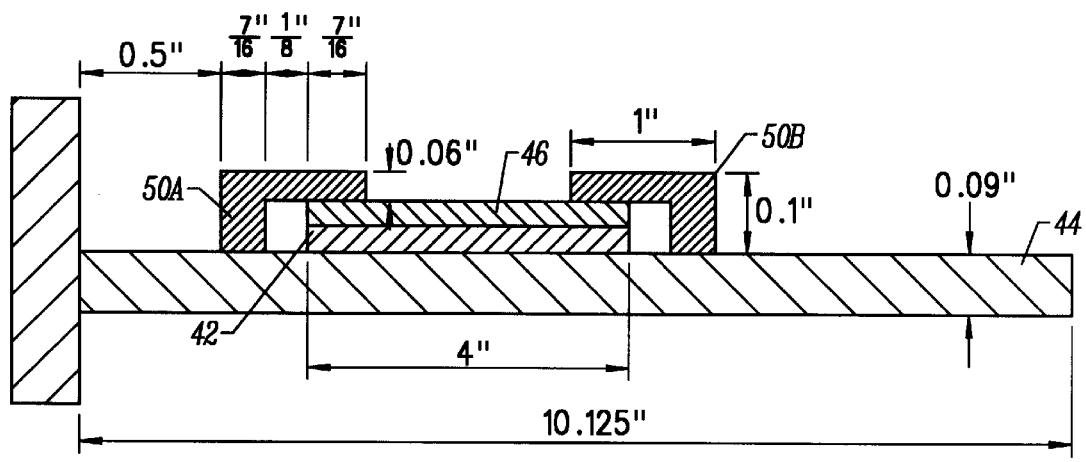
FIG. 5 illustrates the active constrained layer structure of FIG. 3 with exemplary dimensions.

FIG. 5 corresponds to FIG. 3, but includes a set of measurements, in inches, for one embodiment of the invention. Those skilled in the art will recognize that a variety of alternate embodiments can be used in view of the information provided herein. The information in FIG. 5 is merely a single example of an implementation of the invention. In the example of FIG. 5, the substrate 44 is aluminum, the viscoelastic layer 42 is the commercially available material known as ISD 112, sold by 3M Corporation, Minneapolis, Minn. The viscoelastic layer 42 has a length (left-to-right in FIG. 5) of 4", a width (direction into FIG. 5) of 0.5", and a depth (top-to-bottom in FIG. 5) of 0.01". The piezoelectric layer 46 is formed of the material PKI 502, sold by PiezoKinetic, Inc., Bellfont, Pa. The piezoelectric layer has a length of 4", a width of 0.5", and a depth of 0.03". The dimensions for the edge elements are provided in the figure. The edge element may be formed of steel and be bonded to the piezoelectric layer 46 and the substrate 44 with an adhesive, such as an epoxy. For example, the Twin Tube Radio Shack Epoxy sold by Tandy Corporation, Austin, Tex., may be used. In general, the edge elements need to be relatively light and stiff. Steel, Nickel, Tungsten, and plastic may be used for this purpose.

Those skilled in the art will recognize a variety of alternate embodiments of the invention. For instance, layers may be inserted between the VEM layer 42 and the substrate 44 and between the piezoelectric layer 46 and the VEM layer 42. A reference to the VEM layer 42 being on top of the substrate 44 contemplates such a configuration. Similarly, a reference to the piezoelectric layer 46 being on the VEM layer 42 contemplates such a configuration.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. An apparatus for reducing vibrations of a substrate, comprising:

a passive viscoelastic damping material positioned on top of said substrate;

an active piezoelectric layer positioned on top of said passive viscoelastic damping material; and a set of edge elements physically connecting said active piezoelectric layer to said substrate to transmit active forces and moments from said piezoelectric layer to said substrate.

2. The apparatus of claim 1 wherein an edge element of said set of edge elements is an edge element clamp structure.

3. The apparatus of claim 1 wherein an edge element of said set of edge elements is an edge element post structure.

4. The apparatus of claim 1 further comprising a sensor positioned on said substrate to generate a sense signal in response to vibrations of said substrate.

5. The apparatus of claim 4 further comprising a controller connected to said sensor to generate a control signal in response to said sense signal.

6. The apparatus of claim 5 further comprising an energy source connected to said controller to generate an energy signal for application to said active piezoelectric layer in response to said control signal.

7. A method of reducing vibrations within a substrate, comprising:

positioning a passive viscoelastic damping material on top of said substrate;

placing an active piezoelectric layer on top of said passive viscoelastic damping material; and transmitting active forces and moments from said piezoelectric layer to said substrate with set of edge elements physically connecting said active piezoelectric layer and said substrate.

8. The method of claim 7 wherein said transmitting step includes the step of transmitting active forces and moments from said piezoelectric layer to said substrate with edge element clamp structures.

9. The method of claim 7 wherein said transmitting step includes the step of transmitting active forces and moments from said piezoelectric layer to said substrate with edge element post structures.

10. The method of claim 7 further comprising the step of generating a sense signal in response to vibrations of said substrate.

11. The method of claim 10 further comprising the step of producing a control signal in response to said sense signal.

12. The method of claim 11 further comprising the step of applying an energy signal to said active piezoelectric layer in response to said control signal.

* * * * *